United States Patent
Clark et al.

(10) Patent No.: US 7,551,557 B2
(45) Date of Patent: Jun. 23, 2009

(54) METHOD AND SYSTEM FOR ENSURING ARBITRATION FAIRNESS IN BUS RING TOPOLOGY

(75) Inventors: Scott Douglas Clark, Rochester, MN (US); Jeffrey Joseph Ruedinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 10/464,893

(22) Filed: Jun. 19, 2003

(65) Prior Publication Data

US 2004/0258088 A1    Dec. 23, 2004

(51) Int. Cl.
*H04L 12/54* (2006.01)

(52) U.S. Cl. .................. 370/230; 370/235; 370/412; 370/428

(58) Field of Classification Search ......... 370/412–418, 370/428–429, 230, 411
See application file for complete search history.

(56) References Cited

U.S. PATENT DOCUMENTS

| | | | |
|---|---|---|---|
| 5,231,633 A * | 7/1993 | Hluchyj et al. | 370/429 |
| 6,496,516 B1 * | 12/2002 | Dabecki et al. | 370/460 |
| 6,718,552 B1 * | 4/2004 | Goode | 725/95 |
| 6,993,041 B2 * | 1/2006 | Yamamoto | 370/413 |
| 2003/0058795 A1 * | 3/2003 | Lansing et al. | 370/235 |
| 2003/0099193 A1 * | 5/2003 | Liu et al. | 370/229 |
| 2003/0118016 A1 * | 6/2003 | Kalkunte et al. | 370/389 |

\* cited by examiner

*Primary Examiner*—Chi H. Pham
*Assistant Examiner*—Shick Hom
(74) *Attorney, Agent, or Firm*—Matthew B. Talpis; Gregory W. Carr

(57) ABSTRACT

The present invention provides for dynamically determining a ratio of forwarded packets to injected packets to be transmitted in a bus ring. At least one forwarded packet is received into a first queue. An injected packet is received into a second queue. A determination, or snapshot, of the number of forwarded packets in the first queue due to the presence of the injected packet in the second queue is triggered. Packets corresponding to the snapshot are transmitted. After the packets are transmitted, if there is another injected packet stored in the second queue, another snapshot is performed. Packets corresponding to this snapshot are transmitted, and so on.

19 Claims, 3 Drawing Sheets

PSEUDO-CODE
TO SELECT A PACKET FOR TRANSMITTAL FROM A PROCESSOR NODE AS DYNAMICALLY DETERMINED BY A FORWARDED TO INJECTED PACKET RATIO

```
snapshot low priority traffic
while (low priority snapshot count > 0) or (there is high priority
traffic to be injected or forwarded)
{    snapshot high priority traffic
    while (high priority snapshot count <> 0)
    {   if (high priority snapshot count = 1) and (high priority
inject
packet is part of the high priority snapshot)
            send from high priority inject buffer
        else
            send from high priority forward buffer
        decrement high priority snapshot count
    }
    if (low priority snapshot count > 0)
        if (low priority snapshot count = 1) and (low priority inject
packet is part of the low priority snapshot)
            send from low priority inject buffer
        else
            send from low priority forward buffer
        decrement low priority snapshot count
}
```

FIG. 3

METHOD AND SYSTEM FOR ENSURING ARBITRATION FAIRNESS IN BUS RING TOPOLOGY

TECHNICAL FIELD

The invention relates generally to a data ring topology and, more particularly, to dynamically altering a ratio of forwarded packets to injected packets that are to be transmitted within the data ring topology.

BACKGROUND

Data ring topology buses are an increasingly important part of computer architecture design. A data ring can be generally defined as a circular coupling of nodes of processors, wherein the data output of one processor can be input into the input of another processor within the data ring.

Inputting data from the outside of the ring, also known as injecting data into the ring, while trying to forward data already existing within the data ring, can create problems. During a clock cycle, a processor node of the data ring can inject one data packet onto the ring. Alternatively, the node can forward one packet onto the data ring. However, the node can not both inject a packet onto the ring and forward a packet within the data ring simultaneously during the same clock cycle.

If the data to be injected from outside the data ring into the ring is given absolute priority over data already existing within the ring, the data ring can become clogged with data packets. For instance, if each node is injecting data from outside onto the ring simultaneously before forwarding any cached data packets in the next round, the data rings could get clogged. This could be because each node is injecting data, and there could be more data than the data ring could handle. Alternatively, giving absolute priority to forwarded data packets over injected data packets could also create problems. For instance, if two processing nodes of a three or more node bus ring are separated by at least one interposed node, communication between the two separated nodes could prevent new inject packets from entering the network from the interposed node.

One conventional approach to solve the conflict between differing priorities between injected versus forwarded data packets is to transmit a predetermined ratio of forwarded packets to injected packets. Typically, processing nodes have buffers for both received forwarded packets and injected packets, both of which are to be placed in the ring. The fixed ratio can work well in a highly utilized ring wherein all the processing nodes evenly inject new data in proportion to the forwarded data and the injection rate at the nodes is known and generally constant.

However, there is a problem with using a fixed ratio of transmitting forwarded data packets to injected data packets. Sometimes, a fixed ratio does not react well to changes in the ratio to forwarded versus injected traffic. Sometimes, a fixed ratio does not react well to changes in the instantaneous relationship of forwarded versus injected traffic.

Therefore, there is a need for a system and a method for injecting data packets into a bus data ring that overcomes at least some of the problems associated with conventional injection of data packets into a bus data ring.

SUMMARY OF THE INVENTION

The present invention provides for dynamically determining a ratio of forwarded packets to injected packets to be transmitted in a bus ring. At least one forwarded packet is received into a first queue. An injected packet is received into a second queue. A determination of the number of forwarded packets in the first queue due to the presence of the injected packet in the second queue is triggered.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3 illustrates code for selecting between lower priority and higher priority injected data snapshots.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless indicated otherwise.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions.

Figure 1:
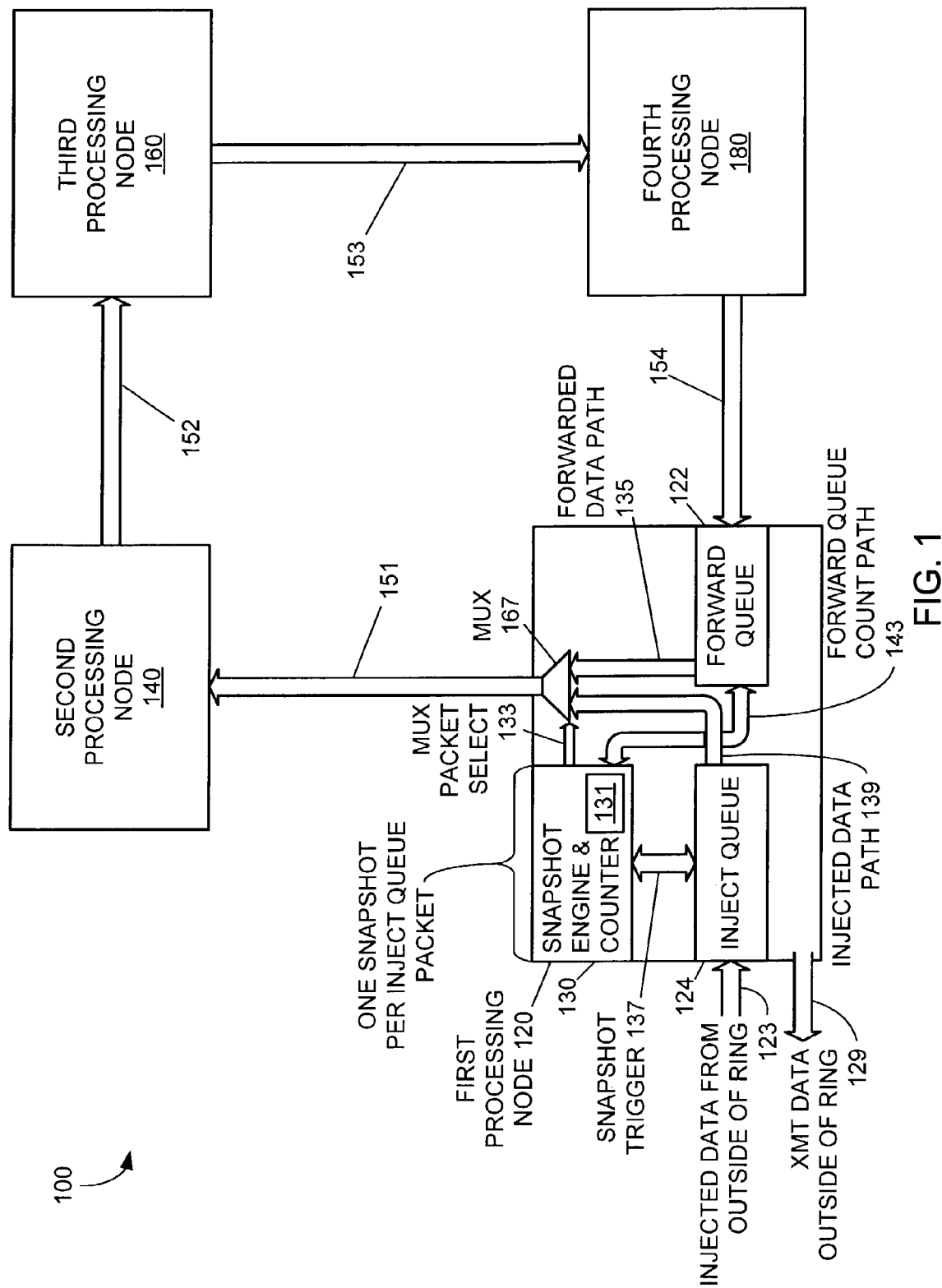
FIG. 1 schematically depicts a four processing node bus ring using a snapshot engine and a snapshot counter for generating a ratio for transmitting forwarded packets to an injected packet.

Turning now to FIG. 1, disclosed is a data ring bus 100. The data ring bus has a first node 120 coupled to a second processing node 140 through a bus 151. The second processing node 140 is coupled to a third processing node 160 through bus 152. The third processing node 160 is coupled to a fourth processing node 180 through bus 153. The fourth processing node 180 is coupled to the first processing node 120 through bus 154.

The node 120 has an injected data path 123. The injected data path 123 receives injected data packets from outside the bus data ring 100. Any injected packets received over the injected data path 123 are stored in the inject queue 124. Furthermore, the node 120 receives forwarded packets over the bus 154 and stores these forwarded data packets in a forward queue 122. After traversing at least part of the ring and subjected to the appropriate processing, a data packet can exit from the node 120 through data out path 129.

The inject queue 124 is coupled to a snapshot engine 130 over a snapshot trigger 137 and injected data path 139. The snapshot engine 130 has a snapshot counter 131. The forward queue 122 is coupled to the snapshot engine 130 by a forward queue count path 143. The forward queue count path 143 conveys indicia of the number of data packets in the forward data path. Generally, the snapshot engine 130 dynamically determines and employs a ratio between each injected data packet in the inject queue 124 and the number of forwarded packets in the forward queue 122 when the inject queue 124 processes the injected packet.

In the node 120, when an injected packet is received and processed in the inject queue 124, the number of forwarded packets present in the forward queue is read over the forward queue count path 143. The count corresponding to the number of the cached forwarded packets in the forward queue 122 is then incremented by a constant number, such as one (representing the injected packet), and saved in the snapshot counter 131. In the present embodiment, although one injected packet per snapshot is illustrated, those of skill in the art understand that one of a plurality of fixed number of injected packets per snapshot could be used. The total count of packets within the snapshot counter 131 at any one time is termed a "snapshot."

The count within the snapshot counter 131 determines the ratio between forwarded packets and injected packets to be transmitted and decremented before taking the next snapshot. The forwarded packet is transmitted to a multiplexer (MUX) 167 over a forwarded data path 135. The injected data packet is also transmitted to the MUX packet 167 over the injected data path 139.

The snapshot engine 130 and the snapshot counter 131 both use a coupled MUX packet select path 133 to enable the transmission of the data packets within the snapshot. In other words, the snapshot engine 130 reads the count in the snapshot counter 131. Then, the snapshot engine 130 selects the next forwarded packet as the packet to be transmitted through bus 151 by the MUX 167. After this packet is transmitted, the snapshot engine 130 decrements the count within the snapshot counter 131. The snapshot engine 130 then determines whether the count within the snapshot counter 131 is equal to one. If it is not, the snapshot engine 130 again authorizes the transmission of the next forwarded packet through the MUX 167 and again decrements the snapshot count in the snapshot counter 131. The decrementing of the snapshot count in the snapshot counter 131 continues until the snapshot count equals one. Once the snapshot count equals one, the next cached injected data packet is selected to be transmitted from the MUX 167. The snapshot counter then equals zero.

Until the snapshot counter equals zero, no forwarded packets that were not counted as part of the initial snapshot can be sent onto bus 151. In other words, the forwarded data packets corresponding to the snapshot are transmitted on bus 151, and then the injected data packet is transmitted. This allows the ratio of forwarded packets in the forward queue 122 to injected packets within the inject queue 124 to change dynamically and not to be at a fixed ratio of forwarded packets to injected packets.

However, while the snapshot engine 130 is decrementing the count within the snapshot counter 131, both the forward queue 122 and the inject queue 124 can receive more data packets. If at least one injected data packet is stored within the inject queue 124, a new snapshot is taken of the entire forward queue 122 of the number of forwarded packets stored in the forward queue 122 when the previous snapshot reaches zero. Then, the snapshot count within the snapshot counter 131 is decremented for each data packet sent on the bus 151 as authorized by the snapshot engine 130. This continues until the snapshot register equals zero. Taking snapshots continues until all packets in the inject queue 124 are transmitted in the ring, one snapshot per injected data packet. If no packets are in the inject queue 124, then the forwarded packets in the forward queue are transmitted onto the bus 151. In an alternative embodiment, the injected packet within a snapshot is transmitted first, then the snapshotted packets from the forwarded buffer are transmitted afterwards.

Although the first node 120 is illustrated as having the snapshot engine 130 and counter 131, the MUX 167, and so on, those of skill in the art understand that the nodes 140, 160 and 180 can have similar functionality and elements as node 120.

Figure 2:
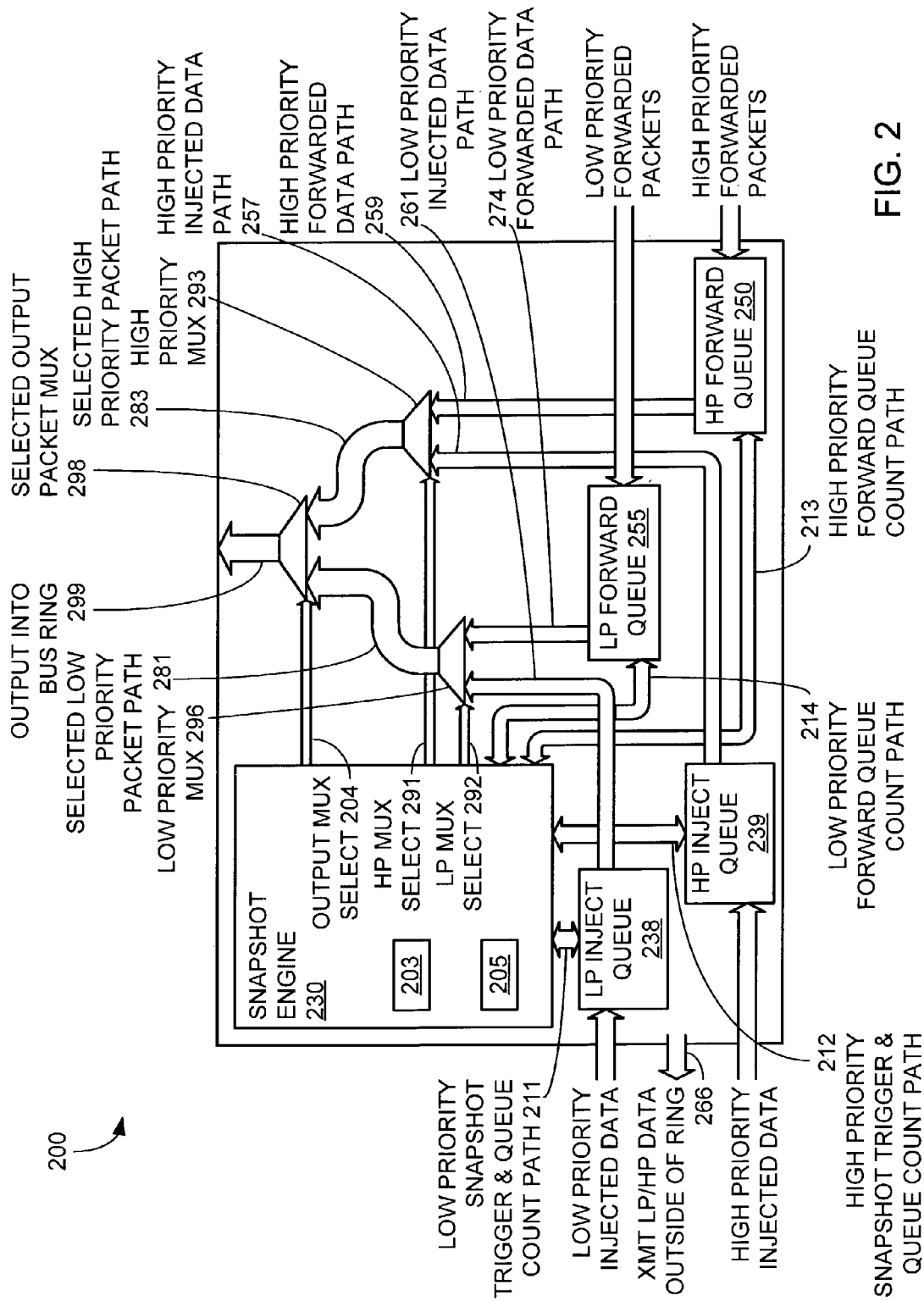
FIG. 2 illustrates a processing node for injecting and forwarding both low priority and high priority data packets with use of a snapshot engine and counter.

Turning now to FIG. 2, illustrated is a node 200 for injecting and forwarding both low priority and high priority data packets with the use of a snapshot engine and a snapshot counter within the system 100. In node 200, high priority forwarded data is received in a high priority forward queue 250. Low priority forwarded data is received in a low priority forward queue 255. Low priority injected data is received in a low priority inject queue 238. High priority injected data is received in a high priority inject queue 239. A plurality of nodes 200 can be coupled in a bus ring topology.

The high priority forward queue 250, the low priority forward queue 255, the high priority inject queue 239 and the low priority inject queue 238 are monitored by a snapshot engine 230. The queues 238, 239, 250, and 255 are monitored by the snapshot engine 230 over data paths 211, 212, 213 and 214, respectively. The data paths 211, 212, 213, and 214 are generally used to convey indicia of the packet count within each of their respective queues.

In the node 200, data packets have an associated priority level. In FIG. 2, the data packets are illustrated as having a high (or higher) priority and a low (or lower) priority. However, those of skill in the art understand that more or different rankings or relative priorities or hierarchies can also be used.

In the node 200, both the forwarded packets and the injected packets are stored in the queue associated with their priority level. When a high priority snapshot is taken, if at least one high priority injection packet is stored in the high priority injection queue 239 as read over the high priority snapshot trigger and queue count path 212, the snapshot engine 230 takes a high priority snapshot of the high priority forward queue 250. This count is incremented to include the high priority injection packet. Otherwise, a snapshot is taken of the high priority forward queue 250 without including an injection packet, if no injected packet is cached within the high priority inject queue 239.

This count corresponding to the high priority snapshot is stored in a high priority snapshot counter 203. Each high priority forwarded packet is transmitted over the high priority forwarded data path 259 to a high priority MUX 293. The snapshot engine 230 decrements the count in the high priority snapshot counter 203 for each high priority packet transmitted through an output into bus ring 299. The snapshot engine 230 selects over the MUX high priority packet select line 291 the high priority injected data packet if the high priority snapshot counter 203 equals one, assuming an inject packet was part of the snapshot. Otherwise, the snapshot engine 230 selects the high priority forwarded data packet over the MUX high priority packet select line 291. Whichever selection is made, the snapshot engine 230 uses the high priority packet select line 291 coupled between the snapshot engine 230 and the high priority MUX 293.

The selected high priority packet is forwarded over a high priority packet path 283 to a selected output packet MUX 298. The snapshot engine 230 selects the high priority packet through employment of the output MUX packet select line 204. After selection, the high priority packet is output onto the bus ring through path 299. The snapshot engine 230 decrements the snapshot counter 203 and processes the next packet in the high priority snapshot. In the meantime, further high priority forward and injected data packets can be received in their respective queues 250, 239.

However, once the entire high priority snapshot is processed by the snapshot engine 230, the snapshot engine 230 also employs a low priority snapshot of the data packet count in the low priority queues 238, 255. When the first high priority snapshot is finished, the snapshot engine 230 takes a low priority snapshot of the low priority injected and forwarded data in the low priority injection queue 238 and the low priority forwarded queue 255. The low priority snapshot has the count of the number of low priority forward data packets. The low priority count is stored in a low priority snapshot counter 205 and is incremented by the snapshot engine 230 by one to include at least one low priority injected data packet. The snapshot engine 230 selects over the MUX low priority packet select line 292 the low priority injected data packet. The low priority count includes all of the low priority forwarded packets in the low priority forward queue 255, and one low priority injection packet in the low priority inject queue 238. If no low priority injection packets are present in the low priority inject queue 238, then no snapshot is taken. A single low priority forwarded packet is instead processed. Alternatively, after traversing at least part of the ring and subjected to the appropriate processing, a high or low priority data packet can exit from the node 200 through data out path 266.

When a high priority snapshot is processed (that is, all of the corresponding high priority data packets are transmitted on the output 299 for that high priority snapshot), the next packet in the low priority snapshot is processed. The low priority packet is sent to the low priority MUX 296 over the low priority injected data path 261 or the low priority forwarded data path 274, as appropriate. The snapshot engine 230 then selects the appropriate packet as a function of the low priority snapshot counter 205. Alternatively, if no injected packets are stored in the low priority injected queue 238, the next packet in the low priority forward queue 255 is selected. The low priority packet is transmitted over a selected low priority packet path 281. The snapshot engine 230 uses the output MUX packet select line 204 to allow the low priority packet to be transmitted through the selected output packet MUX 298. The low priority packet is then output into the bus ring over the output path 299.

After one packet of the low priority snapshot is processed, a new high priority snapshot is taken and processed. With each processing of a packet, the high priority snapshot counter 203 or the low priority snapshot counter 205 is decremented, as appropriate. This continues until the low priority snapshot reaches zero. Then, a new low priority snapshot is taken. If no low priority injected packets are present in the low priority injected queue 238, a low priority forwarded queue packet is transmitted to the output 299 instead. For each low priority packet within the low priority snapshot counter 205 that is processed, an entire high priority snapshot is processed and decremented.

Turning now to FIG. 3, disclosed is pseudo-code to select a packet for transmittal from the selected output packet MUX 298. In FIG. 3, a snapshot of the low priority data is taken. Then, a snapshot of higher priority data is taken. While the count of the higher priority snapshot does not equal zero, if the higher priority snapshot count equals one, a higher priority data packet is set from the inject buffer if there is at least one higher priority data packet in the injection buffer. Otherwise, a higher priority data packet from the forward buffer is sent. In either event, the higher priority decrement count is decremented.

If the snapshot of the lower priority count is greater than zero, then the following occurs. If the snapshot of the lower priority count is greater than one, a lower priority packet is sent from the low priority forward buffer. If equal to one, a lower priority packet is sent from the lower priority injection buffer. If the low priority snapshot is equal to zero, a snapshot of lower priority traffic occurs again.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A processing node for dynamically adjusting the transmission ratio of forwarded data packets to injected data packets, comprising:
  a snapshot engine comprising a snapshot counter;
  an injected data queue coupled to the snapshot engine;
  a forwarded data queue coupled to the snapshot engine;
  wherein the snapshot engine is configured to, in response to receiving at least one data packet in the injected data queue, take a snapshot comprising determining the count of data packets in the forwarded data queue and storing the count in the snapshot counter;

wherein the snapshot engine is configured to increment the snapshot count based on the received at least one data packet in the injected data queue; and wherein the processing node is further configured to transmit the at least one data packet in the injected data queue and the data packets in the forwarded data queue at the time of the snapshot, decrementing the snapshot count by one for each data packet transmitted, until the snapshot count reaches zero.

2. The processing node of claim 1, wherein the processing node is part of a ring bus topology.

3. The processing node of claim 1, wherein the snapshot counter is decremented whenever a corresponding data packet is transmitted from the processing node.

4. A processing node for dynamically adjusting the transmission ratio of forwarded data packets to injected data packets and higher priority packets and lower priority packets, comprising:

a snapshot engine comprising a higher-priority (HP) snapshot counter and a lower-priority (LP) snapshot counter;

a higher priority injected data queue (HPIDQ) coupled to the snapshot engine;

a higher priority forwarded data queue (HPFDQ) coupled to the snapshot engine;

a lower priority injected data queue (LPIDQ) coupled to the snapshot engine;

a lower priority forwarded data queue (LPFDQ) coupled to the snapshot engine;

wherein the snapshot engine is configured to, in response to transmitting a data packet from the LPIDQ or the LPFDQ, take a higher-priority (HP) snapshot comprising determining the count of data packets in the HPFDQ and the HPIDQ and storing the count in the HP snapshot counter; and wherein the snapshot engine is further configured to, in response to the count in the HP snapshot counter reaching zero, and only in the event there is at least one data packet in the LPIDQ, take a lower-priority (LP) snapshot comprising determining the count of data packets in the LPFDQ and the LPIDQ and storing the count in the LP snapshot counter.

5. A method for dynamically determining a ratio of forwarded packets to injected packets to be transmitted in a bus ring, comprising:

receiving at least one forwarded packet into a first queue;

receiving an injected packet into a second queue;

triggering a snapshot due to the receipt of the injected packet in the second queue;

wherein the snapshot comprises determining the count of data packets in the first queue and storing the count in a snapshot counter;

incrementing the count based on the received injected data packet;

transmitting, subsequent to time of the snapshot, the injected packet and the data packets in the first queue at the time of the snapshot; and decrementing the count by one for each packet transmitted, until the count reaches zero.

6. A computer program product for dynamically determining a ratio of forwarded packets to injected packets to be transmitted in a bus ring, the computer program product having a tangible computer-readable medium with a computer program embodied thereon, the computer program comprising:

computer code for receiving at least one forwarded packet into a first queue;

computer code for receiving an injected packet into a second queue;

computer code for triggering a determination of the number of forwarded packets in the first queue due to the presence of the injected packet in the second queue;

incrementing the count based on the received injected data packet;

transmitting, subsequent to time of the snapshot, the injected packet and the data packets in the first queue at the time of the snapshot; and decrementing the count by one for each packet transmitted, until the count reaches zero.

7. A processor for dynamically determining a ratio of forwarded packets to injected packets to be transmitted in a computer system, the processor including a computer program product having a tangible computer-readable medium with a computer program embodied thereon, the computer program comprising:

computer code for receiving at least one forwarded packet into a first queue;

computer code for receiving an injected packet into a second queue;

computer code for triggering a determination of the number of forwarded packets in the first queue due to the presence of the injected packet in the second queue;

incrementing the count based on the received injected data packet;

transmitting, subsequent to time of the snapshot, the injected packet and the data packets in the first queue at the time of the snapshot; and decrementing the count by one for each packet transmitted, until the count reaches zero.

8. The processing node of claim 1, wherein the processing node transmits the at least one data packet in the injected data queue before the data packets in the forwarded data queue at the time of the snapshot.

9. The processing node of claim 1, wherein the processing node transmits the at least one data packet in the injected data queue after the data packets in the forwarded data queue at the time of the snapshot.

10. The processing node of claim 1, wherein the processing node is further configured to enqueue additional data packets in the forwarded data queue and the injected data queue for transmission after the at least one data packet in the injected data queue and the data packets in the forwarded data queue at the time of the snapshot.

11. The processing node of claim 4, wherein the processing node is further configured to transmit the data packets in the HPFDQ and the HPIDQ at the time of the HP snapshot, decrementing the snapshot count by one for each data packet transmitted, until the HP snapshot count reaches zero.

12. The processing node of claim 11, wherein the processing node transmits data packets in the HPIDQ at the time of the HP snapshot before data packets in the HPFEQ at the time of the HP snapshot.

13. The processing node of claim 11, wherein the processing node transmits data packets in the HPIDQ at the time of the HP snapshot after data packets in the HPFEQ at the time of the HP snapshot.

14. The processing node of claim 4, wherein the snapshot engine is further configured to, in response to the count in the HP snapshot counter reaching zero, and only in the event there is not at least one data packet in the LPIDQ, forward a single data packet from the LPFDQ.

15. The processing node of claim 4, wherein the processing node is further configured to enqueue additional data packets in the HPIDQ, the HPFDQ, the LPIDQ, and the LPFDQ for transmission after data packets in the HPIDQ and the HPFDQ at the time of the HP snapshot.

16. The processing node of claim 4, wherein the processing node is further configured to enqueue additional data packets in the LPIDQ and the LPFDQ for transmission after data packets in the LPIDQ and the LPFDQ at the time of the LP snapshot.

17. The method of claim 5, wherein transmitting comprises transmitting the injected packet before the data packets in the first queue at the time of the snapshot.

18. The method of claim 5, wherein transmitting comprises transmitting the injected packet after the data packets in the first queue at the time of the snapshot.

19. The method of claim 5, further comprising:
enqueueing additional data packets in the first queue and the second queue for transmission after the injected packet and the data packets in the first queue at the time of the snapshot.

* * * * *